Patented Apr. 25, 1939

2,155,856

UNITED STATES PATENT OFFICE 2,155,856

METHALLYL CINNAMATE

Edgar C. Britton and Clarence L. Moyle, Midland, Mich., assignors to The Dow Chemical Company, Midland, Mich., a corporation of Michigan No Drawing. Application September 30, 1937, Serial No. 166,650

2 Claims. (Cl. 260—476)

The present invention relates to methallyl cinnamate, a new unsaturated ester having the formula:

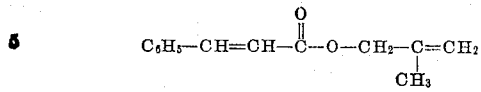

and a method of making the same. This new ester is a clear yellowish mobile liquid useful as a solvent for various materials and as a modifying agent in the polymerization of vinyl compounds, particularly styrene.

Methallyl cinnamate is prepared by reacting benzaldehyde with methallyl acetate in the presence of sodium or other alkali metal, e. g. potassium or lithium. The reaction may be represented by the equation:

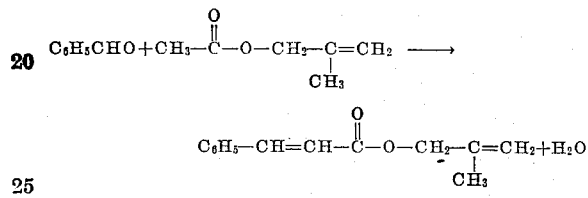

In preparing methallyl cinnamate, we prefer to use one gram mole of benzaldehyde, a molecular excess, e. g. 1.5 to 3 gram moles, of methallyl acetate, and a slight excess, e. g., 1.1 to 1.5 gram atoms, of sodium, although other proportions may be employed. If desired, a small amount of absolute alcohol may be employed as catalyst. The sodium, preferably in finely divided form, is suspended in an inert solvent, e. g., toluene, and the methallyl acetate added. The mixture is then cooled to about 0° C. and the benzaldehyde added with stirring at such a rate that the reaction temperature does not exceed about 5° C. The mixture is then agitated and maintained at a temperature below about 25° C. for several hours, after which it is neutralized with acid, washed with water, dried, and fractionally distilled at reduced pressure to separate methallyl cinnamate.

The following example illustrates one way in which the principles of the invention has been employed, but is not to be construed as limiting the scope thereof.

Example 1

A mixture of 285 grams (2.5 mols) of methallyl acetate and 4 c. c. of absolute alcohol was added to a suspension of 21.6 grams (0.94 mols) of powdered sodium in 400 c. c. of toluene, and the resultant mixture cooled to a temperature of −10° C. 79.5 grams (0.75 mol) of benzaldehyde was then added gradually during 45 minutes, while stirring and maintaining the mixture at temperatures between −10° and 5° C. When the addition of benzaldehyde was complete, the reaction mixture was agitated for 10 hours at temperatures between 0° and 25° C. It was then neutralized with 90 per cent acetic acid, washed with water, and dried over sodium sulphate. The toluene was boiled off at atmospheric pressure and the residual liquid was fractionally distilled at reduced pressure, the fraction distilling at temperatures between 148° and 162° C. at 8 millimeters pressure being collected. This fraction was redistilled, whereby there was obtained 52.5 grams of methallyl cinnamate, a clear yellowish mobile liquid having a boiling point between 145° and 153° C. at 8 millimeters pressure and a refractive index of 1.5547 at 21° C.

Other modes of applying the principle of the invention may be employed, change being made as regards the details hereinbefore disclosed, provided the product or method stated by any of the following claims or the equivalent of such stated product or method be employed.

We therefore particularly point out and distinctly claim as our invention:

1. 2-methylallyl cinnamate, a clear yellowish mobile liquid having a boiling point between about 145° and about 153° C. at 8 millimeters pressure and a refractive index of about 1.5547 at 21° C.

2. The method of preparing 2-methylallyl cinnamate which comprises reacting benzaldehyde with 2-methylallyl acetate in the presence of an alkali metal at a temperature below about 25° C.

EDGAR C. BRITTON.
CLARENCE L. MOYLE.